(12) United States Patent
Ito

(10) Patent No.: US 8,795,551 B2
(45) Date of Patent: Aug. 5, 2014

(54) WATER-ABSORBING MATERIAL

(76) Inventor: Hiroshi Ito, Tokyo (JP)

(*) Notice: Subject to any disclaimer, the term of this patent is extended or adjusted under 35 U.S.C. 154(b) by 0 days.

(21) Appl. No.: 13/357,586

(22) Filed: Jan. 24, 2012

(65) Prior Publication Data

US 2012/0119140 A1 May 17, 2012

Related U.S. Application Data

(63) Continuation of application No. PCT/JP2010/063356, filed on Aug. 6, 2010.

(30) Foreign Application Priority Data

Aug. 13, 2009 (JP) .................... 2009-187849
Oct. 15, 2009 (JP) .................... 2009-238769

(51) Int. Cl.
*C09K 3/00* (2006.01)
*B01J 20/26* (2006.01)
*A01K 1/015* (2006.01)

(52) U.S. Cl.
CPC ............. *A01K 1/0155* (2013.01); *A01K 1/0152* (2013.01); *Y02C 10/08* (2013.01)
USPC .......................................... 252/194; 502/402

(58) Field of Classification Search
CPC ....... B01D 53/28; B01J 20/26; A01K 1/0154; A01K 1/0155
USPC ........................................................ 252/194
See application file for complete search history.

(56) References Cited

U.S. PATENT DOCUMENTS

| 5,823,139 A | 10/1998 | Ito |
| 5,900,253 A | 5/1999 | Ito |
| 5,972,509 A | 10/1999 | Ito |

FOREIGN PATENT DOCUMENTS

| JP | 3007164 B2 | 1/1997 |
| JP | 2895963 B2 | 8/1997 |
| JP | 2000-295933 | 10/2000 |
| JP | 2001-204288 | 7/2001 |
| JP | 2005-21071 | 1/2005 |
| JP | 3850430 B2 | 11/2005 |
| JP | 2009-44992 | 3/2009 |

OTHER PUBLICATIONS

English machine translation of Takayuki et al., JP 2005-021071 (Jan. 27, 2005).*
Japanese Office Action for corresponding JP Application No. 2009-238769, Sep. 18, 2012.
International Search Report for corresponding International Application No. PCT/JP2010/063356, Nov. 2, 2010.

* cited by examiner

*Primary Examiner* — Peter F Godenschwager
(74) *Attorney, Agent, or Firm* — Ditthavong & Steiner, P.C.

(57) ABSTRACT

A water absorbing material includes a waste material. The waste material has a content of 20 wt % to 90 wt % to a total weight of the water absorbing material. The waste material is a water absorbing material which is granular and which comprises two or more plastic materials. The water absorbing material has an ignition point of 400° C. or greater, an ash content of 20 wt % or less, a calorific value in a range of 2930 J/g (700 kcal/kg) to 10465 J/g (2500 kcal/kg) in a state after absorbing moisture that has a weight in a range of 1.1 to 1.6 times the total weight, and a carbon dioxide yield in a range of 1700 g/kg to 2500 g/kg.

8 Claims, 1 Drawing Sheet

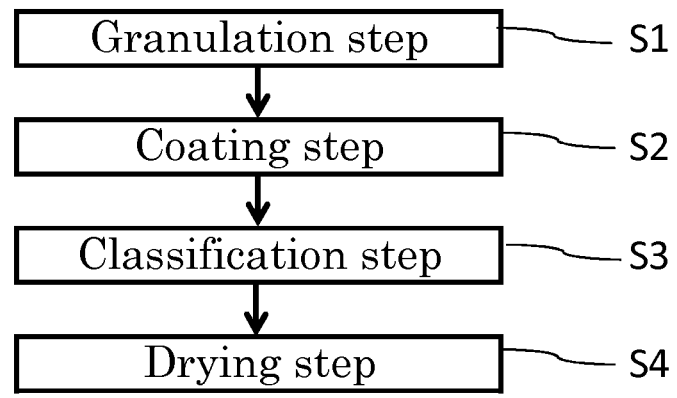

WATER-ABSORBING MATERIAL

CROSS-REFERENCE TO RELATED APPLICATIONS

The present application is a continuation application of International Application No. PCT/JP2010/063356, filed Aug. 6, 2010, which claims priority to Japanese Patent Application No. 2009-187849, filed Aug. 13, 2009 and to Japanese Patent Application No. 2009-238769, filed Oct. 15, 2009. The contents of these applications are incorporated herein by reference in their entirety.

BACKGROUND OF THE INVENTION

1. Field of the Invention

The present invention relates to a water absorbing material.

2. Discussion of the Background

The applicant pioneered production of a material for processing excretions for animals such as pets, and has been developing a material for processing excretions for animals, which can be incinerated after use (in a urine-containing state) due to the use of a paper diaper waste having a high calorific value as a component (for example, see Japanese Patent No. 2895963 and Japanese Patent No. 3007164).

In recent years, granular water absorbing material for absorbing fluids such as excretions of humans or animals (hereinafter simply referred to as a "water absorbing material") have been widely recognized, and various needs have arisen as the number of users has increased, creating a situation in which a water absorbing material doesn't earn users' support simply because it can be incinerated after use.

For example, recently, living-room furnishings such as curtains and wallpapers are produced from fireproof materials. Water absorbing materials also are often used indoors, and therefore water absorbing materials are increasingly expected to have fireproof properties.

Meanwhile, with increasing environmental awareness, efficient disposal of discarded manufactured goods and reduction in carbon dioxide generation to prevent global warming are encouraged. Water absorbing materials are no exception and there is growing demand for materials that meet such a need.

SUMMARY OF THE INVENTION

According to one aspect of the present invention, a water absorbing material includes a waste material. The waste material has a content of 20 wt % to 90 wt % to a total weight of the water absorbing material, and includes two or more chemically distinct plastic materials. The water absorbing material is granular, and has an ignition point of 400° C. or greater, an ash content of 20 wt % or less, a calorific value in a range of 2930 J/g (700 kcal/kg) to 10465 J/g (2500 kcal/kg) in a state after absorbing moisture that has a weight in a range of 1.1 to 1.6 times the total weight of the water absorbing material before absorbing moisture, and a carbon dioxide yield in a range of 1700 g/kg to 2500 g/kg.

According to another aspect of the present invention, a water absorbing material includes a waste material. The waste material has a content of 20 wt % to 90 wt % to a total weight of the water absorbing material, and includes two or more chemically distinct plastic materials. The water absorbing material is granular, and has an ignition point of 400° C. or greater, an ash content of 20 wt % or less, a calorific value in a range of 11871 J/g (2836 kcal/kg) to 34250 J/g (8182 kcal/kg) before absorbing moisture, and a carbon dioxide yield in a range of 1700 g/kg to 2500 g/kg.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 1 is a flowchart showing a method for producing of the water absorbing material of the present invention.

DESCRIPTION OF THE EMBODIMENTS

The water absorbing material of the embodiment of the present invention contains 20 wt % to 90 wt % of a waste material relative to the total weight, the waste material is a granular water absorbing material containing two or more plastic materials, and the water absorbing material has an ignition point of 400° C. or greater, an ash content of 20 wt % or less, a calorific value in a range of 2930 J/g (700 kcal/kg) to 10465 J/g (2500 kcal/kg) in a state after absorbing moisture that has a weight in a range of 1.1 to 1.6 times the total weight before absorbing moisture, and a carbon dioxide yield in a range of 1700 g/kg to 2500 g/kg.

Also, the water absorbing material of the embodiment of the present invention contains 20 wt % to 90 wt % of a waste material relative to the total weight, the waste material being a granular water absorbing material containing two or more plastic materials, has an ignition point of 400° C. or greater, an ash content of 20 wt % or less, a calorific value before absorbing moisture in a range of 11871 J/g (2836 kcal/kg) to 34250 J/g (8182 kcal/kg), and a carbon dioxide yield in a range of 1700 g/kg to 2500 g/kg.

Furthermore, in the embodiment of the present invention, the water absorbing material (individual water absorbents constituting the water absorbing material) may have a multi-layer structure having a granular core portion and a coating layer portion with which the core portion is coated.

The coating layer portion may be configured to contain powder of a water-soluble coloring material that has not produced a color such that the water-soluble coloring material can develop a color upon contact with moisture absorbed externally (such as urine).

The term "waste material" as used herein is intended to include not only domestic waste materials and industrial waste materials but also goods that, despite being unused goods manufactured by companies or individuals, were for some reason not used for the originally intended purpose, and goods that were diverted to other applications and disposed of.

The term "ignition point" is a temperature at which a material catches fire without any fire source when heated in air. The term "ash content" refers to the total amount of noncombustible material contained in a sample and is defined herein as a value obtained by dividing the weight of ash remaining when a sample is completely incinerated at 550 to 600° C. by the weight before incineration.

Moreover, two or more plastic materials collected from waste materials are essential as components of the water absorbing material having the above-described properties, and it is preferable to blend other organic waste in a suitable proportion.

Having a high ignition point of 400° C. or greater, the water absorbing material of the embodiment of the present invention has enhanced fireproof properties and improved fire safety.

Moreover, an ash content of 20 wt % or less allows the water absorbing material of the embodiment of the present invention to have a small weight once incinerated, i.e., the water absorbing material can be efficiently incinerated. Moreover, according to the embodiment of the present invention, the water absorbing material has a calorific value of 2930 J/g (700 kcal/kg) or greater in a state after absorbing moisture that has a weight in a range of 1.1 to 1.6 times the total weight (hereinafter referred to as a "calorific value after moisture absorption") or a calorific value of 11871 J/g (2836 kcal/kg) before absorbing moisture (hereinafter referred to as a "calorific value before moisture absorption"), and therefore once the water absorbing material has absorbed moisture, it can undergo self-sustaining combustion. Therefore, the water absorbing material can be efficiently incinerated without using supplemental fuel such as petroleum-based fuel when combusted. Moreover, with the upper limit of the calorific value after moisture absorption being 10465 J/g (2500 kcal/kg) or the upper limit of the calorific value before moisture absorption being 34250 J/g (8182 kcal/kg), damage to an incinerator by heat generation during incineration can be prevented, allowing incineration to be performed using a general incinerator.

The water absorbing material of the embodiment of the present invention uses a waste material as its component, and thus carbon dioxide that would otherwise be generated from a waste material or the like if the waste material or the like was disposed of can be suppressed. In addition, it is possible to provide a water absorbing material that reuses a waste material or the like that is discharged in large amounts, thus allowing a resource saving request to be addressed and a water absorbing material to be produced inexpensively.

According to the embodiment of the present invention, a water absorbing material that has remarkable fire resisting properties, that can be efficiently disposed of, and that is capable of contributing to prevention of global warming can be provided.

One aspect (hereinafter referred to as an "embodiment") of carrying out the present invention will now be described in detail in reference to the drawing, using as an example a water absorbing material (urine processing material) for processing excretions of a pet such as a cat or a dog.

Water Absorbing Material

The water absorbing material of the embodiment of the present invention has a multi-layer structure formed of a granular core portion and a coating layer portion coating the surface of the core portion. Note that a water absorbing material having a multi-layer structure is itself a known technology as seen in a number of applications by the applicant.

(1) Properties of Water Absorbing Material

The properties of the water absorbing material that constitutes the embodiment of the present invention include: the ignition point is 400 degrees or greater; the ash content is 20 wt % or less; the calorific value is in the range of 2930 J/g (700 kcal/kg) to 10465 J/g (2500 kcal/kg) in a state after absorbing moisture that has a weight of 1.1 to 1.6 times the total weight, or the calorific value is in the range of 11871 J/g (2836 kcal/kg) to 34250 J/g (8182 kcal/kg) before absorbing moisture; and the $CO_2$ yield of the water absorbing material before use is in the range of 1700 g/kg to 2500 g/kg. There are conventional water absorbing materials that have one of the aforementioned four properties. A feature of the water absorbing material constituting the embodiment of the present invention is having all the properties.

Ignition Point

For the water absorbing material to have a fireproof effect, it is naturally preferable that the water absorbing material has a high ignition point. The ignition point of ordinary paper is about 300° C., and the water absorbing material is stored at normal temperature. Therefore, it is preferable in terms of fireproof properties that the water absorbing material has an ignition point of 400° C. including a safety margin of +100° C., and preferably an ignition point of no less than 450° C., which is the ignition point of polyethylene used for various applications such as containers and packaging films.

Ash Content

The ash content of conventional water absorbing materials developed by the applicant that can be incinerated is as little as about 40 wt %. Still, the lower the ash content, the more preferable, and to reduce the cost of landfilling, an ash content is no greater than 20 wt %, which is not more than ½ of that of conventional products, preferably no greater than 15 wt %, and more preferably no greater than 10 wt %.

Calorific Value

If the water absorbing material is to be incinerated after it has absorbed moisture, for the water absorbing material to be able to undergo self-sustaining combustion (to be able to undergo combustion without supplemental fuel), the calorific value of the water absorbing material in a state after absorbing moisture that has a weight no less than 1.1 times the total weight (overall weight) needs to be 2930 J/g (700 kcal/kg) or greater.

That is, the water absorbing material is usually capable of absorbing 1.1 to 1.6 parts by weight of moisture per part by weight of itself, i.e., the moisture absorbency is 1.1 to 1.6 fold. In this case, the weight ratio of the water absorbing material before absorbing moisture to the water absorbing material after absorbing moisture is 47.6% to 38.5%. The latent heat of vaporization of water in normal atmospheric pressure is about 2260 J/g (540 kcal/kg). Since the fluid for which the water absorbing material is intended usually contains impurities such as urine, it is possible to assume that the latent heat of vaporization is about 2721 J/g (650 kcal/kg). For incinerating water absorbing material that has absorbed water, the calorific value that enables self-sustaining combustion is 2930 J/g (700 kcal/kg) or greater (more preferably 3767 J/g (900 kcal/kg) or greater).

Meanwhile, in incineration with an ordinary incinerator, the upper limit of the amount of heat at which no damage is caused to the incinerator is said to be 10465 J/g (2500 kcal/kg).

Therefore, the calorific value X of the water absorbing material before absorbing moisture (calorific value before the water absorbing material is used) needs to satisfy the following formula:

$$10465 \text{ J/g}(2500 \text{ kca/kg}) \geq 0.476x \text{ to } 0.385x - 2721(650 \text{ kcal/kg}) \geq 2930(700 \text{ kcal/kg})$$

Therefore, the lower limit of the calorific value X of the water absorbing material before absorbing moisture (before use) needs to be approximately 11871 J/g (2836 kcal/kg) to 14676 J/g (3506 kcal/kg), and the upper limit needs to be 27703 J/g (6618 kcal/kg) to 34250 J/g (8182 kcal/kg) (according to these results, the calorific value needs to be in the range of 11871 J/g to 34250 J/g, and more preferably 14676 J/g to 27703 J/g).

$CO_2$ Yield $CO_2$ is generated when the water absorbing material is incinerated. It is a well-known fact that $CO_2$ causes global warming, and reduction thereof is required.

Meanwhile, the $CO_2$ emitted from waste paper is 1520 g/kg (Ministry of Environment, Global Environment Bureau, Global Warming Prevention Division, Committee for Establishing Green House Gas Emissions Calculating Method, August 2002), and the amount of $CO_2$ emitted from waste plastic is 2600 g/kg (Ministry of Environment, 2002 Committee for Establishing Green House Gas Emissions Calculating Method, Report from Waste Subcommittee of Committee for Establishing Green House Gas Emissions Calculating Method). To attain an amount of $CO_2$ emission that is lower than that of waste plastic, components of the embodiment of the present invention are specifically selected.

Naturally, the smaller the amount of $CO_2$ emission, the more preferable, but to have the aforementioned other three properties, the amount of $CO_2$ emitted from the water absorbing material has to exceed that of waste paper, and thus the $CO_2$ yield of the water absorbing material before use is in the range of 1700 g/kg to 2500 g/kg.

(2) Components of Water Absorbing Material

Hereinbelow, the components of the water absorbing material having the aforementioned properties is described in detail.

For the water absorbing material of the embodiment of the present invention, two or more plastic materials that are made from waste materials and that have different properties are selected and contained in the range of 20 wt % to 90 wt % relative to the total weight of the water absorbing material.

Generally, plastic materials are made from petroleum and therefore have a low ignition point, a small ash content, and a large calorific value. On the other hand, paper has a higher ignition point than plastic materials but also has a higher ash content and a smaller calorific value.

Hence, a plurality of plastic materials are used in the water absorbing material of the embodiment of the present invention, and a fire-retarding material composed of paper or an inorganic material is added thereto, so as to attain the desired values for ash content, ignition point, calorific value, and $CO_2$ yield.

Components of Core Portion

Two or more plastic materials need to be used as components of the core portion that forms the water absorbing material.

As is well known, plastics usually refer to synthetic resins that are made from petroleum, and although there are a variety of classification methods according to their properties, plastics can be classified into, for example, amorphous plastics, crystalline plastics, and the like.

Specific examples include polypropylene, vinyl chloride, polychlorinated biphenyl, polystyrene, polyacetal, polycarbonate, polyethylene, polyamide, polyethylene terephthalate, polyurethane, vinylidene chloride, acrylic resin, and the like, as well as biodegradable plastics and other types.

Among such plastic materials, as a plastic material suitable for the embodiment of the present invention that can be recovered from waste materials, firstly, it is preferable to use polyurethane (urethane foam) that can be recovered from household electrical appliances such as refrigerators.

Also, as plastic materials that can be recovered from other waste materials, it is preferable to use polyethylene, polypropylene, polyethylene terephthalate, polyamide, plastic rubber, and the like, as well as wastes of animal excretion processing materials, paper diaper wastes, plastic-rich products separated from paper diaper wastes, sanitary napkin wastes, plastic-rich products separated from sanitary napkin wastes, animal paper diaper wastes, plastics-rich products separated from animal paper diaper wastes, breast pad wastes, plastic-rich products separated from breast pad wastes, sweat pad wastes, plastic-rich products separated from sweat pad wastes, incontinence pad wastes, plastic-rich products separated from incontinence pad wastes, animal sheet wastes, plastic-rich products separated from animal sheet wastes, punched-out wastes generated in sanitary material production (trimming loss), or other synthetic resin fiber wastes (hereinafter, these materials are sometimes referred to as "sanitary material wastes or the like").

In addition to the aforementioned plastic materials, other organic wastes can also be added. Usable as such organic wastes are thin-paper wastes, sanitary paper wastes, toilet paper wastes, tissue paper wastes, facial paper wastes, cleaning paper wastes cellulose wadding wastes, paper towel wastes, toilet-seat wipe wastes, newspaper scraps, magazine scraps, buffing dust (fine paper dust mainly generated when cutting or shaving books in bookbinding at printing companies), mechanical pulp wastes, chemical pulp wastes, titanium paper wastes, semichemical pulp wastes, cotton-like pulp wastes, wood pulp wastes, pulverized products of waste paper pulp, fluff pulp, water absorbing fiber wastes, nonwoven fabric wastes, paper dust generated in nonwoven fabric production, paper dust generated in a papermaking process or paper dust generated in sanitary material production, laminated paper wastes, printing scraps of laminated paper, edge scraps of laminated paper, cardboard scraps, paper making sludge, pulp sludge, wood wastes, wood shavings, wood dust, paper dust, extraction residue of roasted coffee beans, used tea leaves, vegetable scraps, used tickets or punched-out scraps, and a pulverized product of two or more of these materials (hereinbelow, these materials are sometimes collectively referred to as "organic wastes").

It is preferable to set the proportion for blending such that the total weight of the at least two plastic materials (for example, polyurethane and a sanitary product waste) is in the range of 20 wt % to 90 wt % and the total weight of the organic waste is in a range of 80 wt % to 10%.

The core portion can be painted in a desired color with a dye (a general term for powder that is used for coloring and that dissolves in water or oil), a pigment (a general term for powder that is used for coloring and that does not dissolve in water or oil), or the like.

As such dyes, animal dyes, vegetable dyes, azo dyes, anthraquinone dyes, indigo dyes, diphenylmethane dyes, triphenylmethane dyes, phthalocyanine dyes or basic dyes are usable. As such pigments, inorganic pigments are preferably used. For example, cobalt pigments, iron pigments, chromium pigments, manganese pigments, copper pigments, vanadium pigments, or sulfide pigment are usable.

These dyes or pigments can be blended by a variety of methods such as methods in which a dye or a pigment is directly blended with the components of the water absorbing material, methods in which a dye or a pigment is blended after being dissolved in a fluid, and methods in which a dye or a pigment is blended after another substance is impregnated with the dye or the pigment.

Components of Coating Layer Portion

The primary purpose of providing the coating layer portion is to allow grains of the water absorbing material wet with excretions such as urine when used to adhere to each other so as to form a mass and enclose the excretions. As the components of the coating layer portion, it is preferable to use, for example, a water absorbing resin, an adhesive material or a mixture of these materials, and a mixture of paper dust.

In the embodiment of the present invention, examples of adhesives include highly water absorbing resins such as starch adhesives and sodium polyacrylate. Usable as a starch adhesive that functions as such an adhesive is potato starch, wheat starch, sweet potato starch, corn starch, tapioca starch, rice starch, dextrin, the gelatinized ($\alpha$) form of these starches, or a similar starch, acrylamide, PVA, carboxymethyl cellulose, or sodium alginate, or two or more of these materials are usable in combination. Other adhesives include highly water absorbing resins, vinyl esters, bentonite, pullulan, casein, gelatin, or the like. These may be used singly or in combination of two or more. Alcohol soluble adhesives include hydroxyethyl cellulose (HEC), hydroxypropyl cellulose (HPC), polyvinyl pyrrolidone (PVP), or the like. Likewise, these may be used singly or in combination of two or more.

Examples of paper dust include thin paper, thin-paper wastes, sanitary paper, sanitary paper wastes, toilet paper, toilet paper wastes, tissue paper, tissue paper wastes, facial paper, facial paper wastes, cleaning paper, cleaning paper wastes, paper towel, paper towel wastes, toilet-seat wipe wastes, newspaper, newspaper scraps, magazine scraps, buffing dust, mechanical pulp, mechanical pulp wastes, chemical pulp, chemical pulp wastes, semichemical pulp, semichemical pulp wastes, cotton-like pulp, cotton-like pulp wastes, wood pulp, wood pulp wastes, pulverized products of waste paper pulp, water absorbing fiber wastes, paper dust generated in bookbinding, paper dust generated in nonwoven fabric production, paper dust generated in a papermaking process, paper dust generated in sanitary material production (paper dust containing a highly water absorbing resin), and a mixture of pulverized products of two or more of these materials. All these materials are used after being pulverized into particulates having a particle size of 0.5 millimeters or less, preferably 0.3 millimeters or less.

If the core portion is originally colored, the second purpose of providing the coating layer portion is to hide the color.

In this case, to effectively provide the coloring function, powder of an inorganic material such as a fine inorganic oxide that is colored in advance with coloring matter and that is relatively inert can also be blended with a coating material. Usable examples of powder of such an inorganic material include powder of kaolin clay, titanium oxide, zinc oxide, calcium carbonate, calcium sulfate, titanium white, gypsum, titanium dioxide, silicon dioxide, aluminium oxide, zeolite, bentonite, kaolin activated carbon, and the like. Among these, use of zeolite, bentonite, kaolin, or activated carbon powder can give a deodorizing function to an excretion processing material due to the adsorption function, and is thus more preferable.

The aforementioned pigments and dyes can be used as a coloring matter for coloring a fine inorganic material, and the aforementioned methods can also be used as methods for blending the inorganic material.

In particular, a configuration is possible in which powder of a known water soluble coloring material that has not developed a color is directly contained in the coating layer portion, and a color can be developed when moisture that enters from outside and the water soluble coloring material come into contact with each other. For example, it is possible that the color (hue, lightness, saturation) of the core portion and that of the coating layer portion are different and once the coating layer portion develops a color, the overall color changes to another color (for example, the core portion is yellow, and once the coating layer develops a blue color, the whole appears green; or the core portion is white, and once the coating layer portion develops a red color, the whole appears pink), or that the core portion and the coating layer portion have similar colors.

Note that it is possible to add to the core portion or the coating layer portion a material that allows the water absorbing material to demonstrate another effect without impairing the water absorbability, such as a deodorizing material, an odor eliminating material, a material having bactericidal properties, a test indicator, or the like.

(3) Functional Effects

The water absorbing material of the embodiment of the present invention is for use when a pet urinates.

That is, a suitable amount thereof is accommodated in a container, and with the material being in the container, a pet is allowed to urinate thereonto. The urine permeates the coating layer portion and is absorbed by the core portion. Once the urine is absorbed by the core portion, the color of the core portion appears through the coating layer portion, thus allowing the used portion and the unused portion to be recognized and grains of the urine-wet coating layer portion to adhere to each other, and a plurality of grains of the water absorbing material to form a mass, thus allowing a user to remove the used portion and incinerate it.

According to the embodiment of the present invention, having a high ignition point of 400° C. or greater, the water absorbing material has enhanced fireproof properties and improved fire safety.

Moreover, since the ash content of the water absorbing material is 20 wt % or less, the weight after incineration can be small and thus the water absorbing material can be effectively incinerated, allowing the cost of disposing of the residue after incineration or the like to be reduced.

Moreover, according to the embodiment of the present invention, since the calorific value of the water absorbing material in a state after absorbing moisture that has a weight in the range of 1.1 to 1.6 times the total weight is 2930 J/g (700 kcal/kg) or greater, or the calorific value before absorbing moisture is 11871 J/g (2836 kcal/kg) or greater, supplemental fuel such as petroleum fuel can be reduced when the water absorbing material in a moisture absorbed state is incinerated, and thus the fuel cost can be reduced and efficient incineration can be attained. Moreover, with the upper limit of the calorific value after moisture absorption being 10465 J/g (2500 kcal/kg) or the upper limit of the calorific value before moisture absorption being 34250 J/g (8182 kcal/kg), damage to an incinerator by heat generation during incineration can be prevented, allowing incineration to be performed using an ordinary incinerator.

Furthermore, according to the embodiment of the present invention, two or more plastic materials that are waste materials are used, and thus carbon dioxide that would be generated from waste materials that are otherwise disposed of can be suppressed. In addition, use of a component derived from a waste material allows a demand for resource saving to be addressed and a water absorbing material to be produced inexpensively.

In the embodiment of the present invention, by configuring such that powder of a water soluble coloring material that has not developed a color is directly contained in the coating layer portion and that a color can be developed when moisture that enters from outside and the water soluble coloring material come into contact with each other, a desired color (hue, lightness, saturation) can be easily developed.

Thereby, while the coating layer portion maintains its original color when the water-soluble coloring material of the coating layer portion before use (before absorbing moisture) does not developed any color, the water-soluble coloring material of the coating layer portion, once absorbing moisture, develops a color due to the moisture entering from outside, thus allowing a water absorbed state to be recognized. Then, it is possible, by taking advantage of the difference in color (hue, lightness, saturation) between the core portion and the coating layer portion, to hide the color of the core portion, or to change the color of the water absorbing material into another color by mixing the color of the core portion and the color of the coating layer portion. There may be the case where part of the coating layer portion flows out and the core portion is exposed, but even in such a case, the aesthetic can be maintained if the coating layer portion and the core portion are designed to have similar colors.

Production Method

Next, the method for producing a water absorbing material of the embodiment of the present invention is described in reference to FIG. 1. The method for producing a water absorbing material of the embodiment of the present invention includes a granulation step (S1), a coating step (S2), a classification step (S3), and a drying step (S4).

(1) Granulation Step

This step is for forming a core portion (S1).

In this step, components such as plastic materials and organic wastes are pulverized with a crusher so as to have a specific size, and the pulverized components are introduced into a mixer such that a specific proportion is attained, and blended. Then, water is added to increase the moisture content to about 20 wt %, and then the substrate is subjected to extrusion granulation. In this manner, a core portion forming operation is performed.

(2) Coating Step

This step is for forming a coating layer portion around the core portion (S2).

In this step, the components (coating materials) of a coating layer portion are blended, and the components are disposed around the core portion using a coating device or the like to form a coating layer portion. In this manner, an operation for producing a granular water absorbing material having a two-layer structure is performed.

(3) Classification Step

This step is for classifying particles of the water absorbing material so as to have a specific size (S3).

In this step, the water absorbing material produced in the previous step is sifted with a sieve having a specific mesh size to separate products that do not have a specific size. In this manner, an operation for obtaining only the products that have a specific size is performed.

(4) Drying Step

This step is for drying the obtained water absorbing materials having a specific size using a dryer (S4).

As described above, the water absorbing material of the embodiment of the present invention can be produced according to a known production method, and it is also possible to suitably add other steps.

Other Embodiments

Hereinabove, one preferable embodiment was described, but the present invention is not limited to that embodiment, and design modifications can be suitably performed without departing from the scope of the present invention. In particular, in the above-described embodiment, a description was given of a water absorbing material, as an example, that has a two-layer structure provided with a granular core portion and a coating layer portion coating the core portion. Needless to say that, however, the water absorbing material of the embodiment of the present invention may be composed solely of a granular water absorbing material without a coating layer portion.

EXAMPLES

To investigate the performance of the water absorbing material of the embodiment of the present invention, samples were prepared using the following formulations, and performance tests were carried out.

Method for Producing Samples

Samples were granular water absorbing materials having a multi-layer structure formed from a core portion and a coating layer portion as in the above-described embodiment, and produced according to the same method as the production method of FIG. 1, with the weight ratio of the components of the core portion to those of the coating layer portion being 83% to 17%, respectively (all samples had this ratio).

(1) Core Portion

Sample Numbers 1 to 7

Polyurethane, paper diaper waste (the primary component thereof was a paper diaper waste generated by a sanitary article manufacturer, which did not meet their product standard, and roughly pulverized to separate paper dust called fluff pulp and a water absorbing polymer present inside, and only the outer structure not including the paper dust and the water absorbing polymer was used), and polyacrylamide were common components, and vinyl chloride wallpaper and buffing dust were added selectively. The respective components and proportions thereof are presented in Table 1.

Sample Number 8

The components were 35 wt % of a paper diaper waste, 30 wt % of a vinyl chloride waste, 30 wt % of a mixture of a nonwoven fabric waste and trimming loss, and 5 wt % of a cigarette filter (Table 2).

(2) Coating Layer Portion

The components of the coating layer portion were the same for all samples, and the coating material was produced by mixing 60 wt % of paper dust (having passed through a 0.35 mm mesh of a crusher), 30 wt % of an adhesive (a mixture of starch, polyacrylamide, and a water absorbing resin (having passed through a 40 μm mesh), and 10 wt % of a water absorbing agent (having passed through an 80 μm mesh), and applied to the surface of the core portion to form the coating layer portion.

Methods of Performance Tests (1) Ignition Point

The ignition point was measured according to a test method in compliance with American Society of Testing and Materials (ASTM) E 659.

(2) $CO_2$ Yield

A combustion tube was filled with a sample (0.20 g, obtained by cutting a produced water absorbing material into small pieces having a length of 3 mm per side), supplied with assist gas (air, 0.3±0.05 L/min) and maintained at a specific temperature (850±10° C.), and the sample was burnt according to the quartz-tube combustion method (air method) (in compliance with JIS K2541-3), and the amount of carbon dioxide generated was measured by gas chromatography (GC-TCD).

(3) Ash Content

A sample was burnt at 550° C. to ignite it for 1 hour, and its mass was measured. When the difference between the presently measured weight of the ignition residue and the previously measured weight thereof was 0.1% or less, it was regarded that the constant mass (weight) had been reached, and the proportion of the constant mass relative to the original weight of the sample was calculated.

(4) Calorific Value

A bomb calorimeter was used to measure the calorific value. Each sample was burnt in the bomb calorimeter to measure the calorific values of the water absorbing materials before use.

Measurement Results

Tables 1 and 2 show, for example, the results of measuring the ignition point, ash content, calorific value, and $CO_2$ yield of each sample according to the above-described methods.

Each sample satisfied the level of the properties of the water absorbing material of the embodiment of the present invention, and was further analyzed in detail.

TABLE 1

| | Component of core potion and proportion (wt %) | | | | | Measurement result | | | |
|---|---|---|---|---|---|---|---|---|---|
| Sample number | Polyurethane | Paper diaper waste | Vinyl chloride wallpaper | Buffing dust | Polyacrylamide | Ignition point (° C.) | Ash content (%) | Calorific value (J/g) | $CO_2$ yield (g/kg) |
| 1 | 79.2 | 19.8 | — | — | 1.0 | 452.0 | 9.2 | 20510 | 2000.0 |
| 2 | 59.4 | 29.7 | 9.9 | — | 1.0 | 451.0 | 9.4 | 20310 | 2000.0 |
| 3 | 49.5 | 29.7 | 9.9 | 9.9 | 1.0 | 476.0 | 9.8 | 20520 | 2000.0 |
| 4 | 39.6 | 39.6 | 9.9 | 9.9 | 1.0 | 452.0 | 9.7 | 20210 | 2000.0 |
| 5 | 29.7 | 49.5 | 9.9 | 9.9 | 1.0 | 475.0 | 8.7 | 20470 | 2000.0 |
| 6 | 29.7 | 59.4 | 9.9 | — | 1.0 | 459.0 | 8.6 | 19860 | 2100.0 |
| 7 | 19.8 | 79.2 | — | — | 1.0 | 461.0 | 7.6 | 18790 | 2000.0 |

TABLE 2

| | Component of core potion and proportion (wt %) | | | | Measurement result | | | |
|---|---|---|---|---|---|---|---|---|
| Sample number | Paper diaper waste | Vinyl chloride wallpaper | Mixture of nonwoven fabric waste and trimming loss | Cigarette filter | Ignition point (° C.) | Ash content (%) | Calorific value (J/g) | $CO_2$ yield (g/kg) |
| 8 | 35.0 | 30.0 | 30.0 | 5.0 | 406.0 | 13.1 | 19060 | 1800.0 |

A comparison of sample number 1 and sample number 7, sample number 2 and sample number 6, and sample number 3 and sample number 5 revealed that a large polyurethane content results in an increased ash content and calorific value and a lowered ignition point. Also, it is now clear that a large amount of a paper diaper waste results in an increased ignition point and a lowered ash content and calorific value.

It was thus confirmed that combining a plurality of plastic materials allows the desired properties to be obtained.

A comparison of sample number 1 and sample number 2 revealed that a large vinyl chloride wallpaper content results in an increased ash content. It is now clear that the vinyl chloride wallpaper content does not greatly influence the ignition point.

A comparison of sample number 2 and sample number 3 as well as sample number 5 and sample number 6 revealed that increasing the buffing dust content instead of the polyurethane or paper diaper waste content results in an increased ash content and calorific value and a high ignition point.

The $CO_2$ yields of sample numbers 1 to 7 were about 2000 g/kg, and thus a large fluctuation was not observed.

While it is necessary to set the formulation of the core portion such that the ignition point and the calorific value are high and the ash content is low by taking advantage of the properties of each component, it is now clear that it is particularly preferable to blend vinyl chloride wallpaper and buffing powder each in a proportion of 10 wt %, polyurethane in a proportion of 30 wt % to 40 wt %, and a paper diaper waste (sanitary product waste or the like) in a proportion of 50 wt % to 40 wt %.

In sample number 8, the weight ratio of plastic material is lower and the weight ratio of waste organic material is higher than those in sample numbers 1 to 7. Accordingly, it is clear that in sample number 8, the $CO_2$ yield is smaller, but the ignition point is lower, the ash content is higher, and the calorific value is lower than those of other samples (the calorific value is not lower than that of sample number 7).

The present invention can be used to absorb fluid such as excretions of humans or animals.

Obviously, numerous modifications and variations of the present invention are possible in light of the above teachings. It is therefore to be understood that within the scope of the appended claims, the invention may be practiced otherwise than as specifically described herein.

The invention claimed is:

1. A water absorbing material comprising:
   a waste material having a content of 20 wt % to 90 wt % to a total weight of the water absorbing material, and including two or more chemically distinct plastic materials; and
   the water absorbing material being granular, and having:
      an ignition point of 400° C. or greater,
      an ash content of 20 wt % or less,
      a calorific value in a range of 2930 J/g (700 kcal/kg) to 10465 J/g (2500 kcal/kg) in a state after absorbing moisture that has a weight in a range of 1.1 to 1.6 times the total weight of the water absorbing material before absorbing moisture, and
      a carbon dioxide yield in a range of 1700 g/kg to 2500 g/kg,
   the water absorbing material having a multi-layer structure having a granular core portion and a coating layer portion, and
   the coating layer portion comprising water-soluble powder of a coloring material which is configured to develop a color upon contact with external moisture, and which is directly contained in the coating layer portion.

2. The water absorbing material according to claim 1, wherein one of the chemically distinct plastic materials is polyurethane.

3. The water absorbing material according to claim 1, wherein the granular core portion has a first color, the coating layer portion develops a second color which is different from the first color when the water-soluble powder of the coloring material comes into contact with the external moisture, and the water absorbing material produces a third color which is a mixed color of the first color and the second color after the second color is developed.

4. The water absorbing material according to claim 1, wherein the water-soluble powder of the coloring material has not developed a color before contact with the external moisture.

5. A water absorbing material comprising:
a waste material having a content of 20 wt % to 90 wt % to a total weight of the water absorbing material, and including two or more chemically distinct plastic materials; and
the water absorbing material being granular, and having:
an ignition point of 400° C. or greater,
an ash content of 20 wt % or less,
a calorific value in a range of 11871 J/g (2836 kcal/kg) to 34250 J/g (8182 kcal/kg) before absorbing moisture, and
a carbon dioxide yield in a range of 1700 g/kg to 2500 g/kg, the water absorbing material having a multi-layer structure having a granular core portion and a coating layer portion, and the coating layer portion comprising water-soluble powder of a coloring material which is configured to develop a color upon contact with external moisture, and which is directly contained in the coating layer portion.

6. The water absorbing material according to claim 5, wherein one of the chemically distinct plastic materials is polyurethane.

7. The water absorbing material according to claim 5, wherein the granular core portion has a first color,
the coating layer portion develops a second color which is different from the first color when the water-soluble powder of the coloring material comes into contact with the external moisture, and
the water absorbing material produces a third color which is a mixed color of the first color and the second color after the second color is developed.

8. The water absorbing material according to claim 5, wherein the water-soluble powder of the coloring material has not developed a color before contact with the external moisture.

\* \* \* \* \*